UNITED STATES PATENT OFFICE.

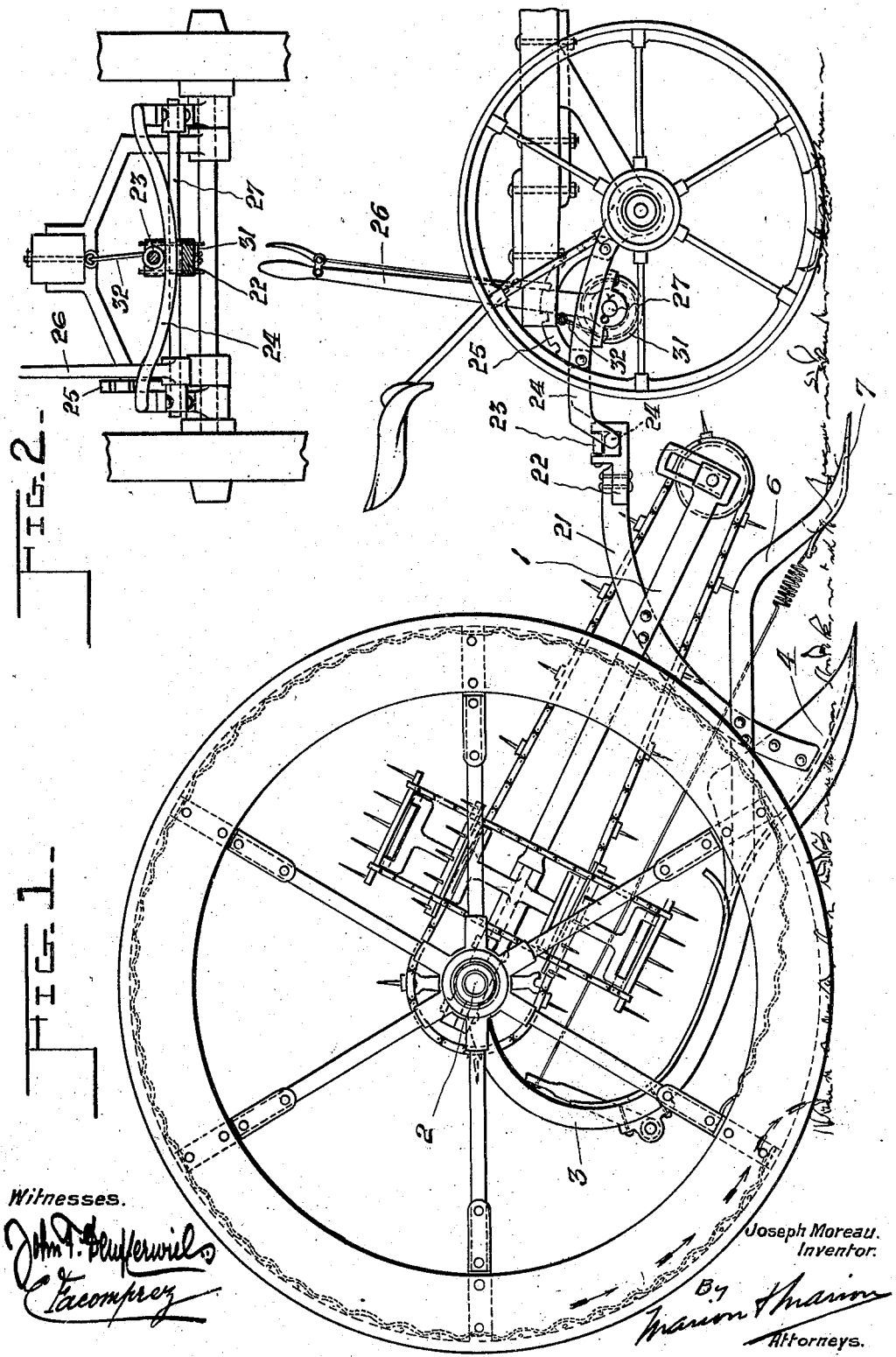

JOSEPH MOREAU, OF ST. GERMAIN DE GRANTHAM, QUEBEC, CANADA.

POTATO-DIGGER.

No. 920,978.     Specification of Letters Patent.     Patented May 11, 1909.

Application filed June 4, 1908. Serial No. 436,556.

*To all whom it may concern:*

Be it known that I, JOSEPH MOREAU, a subject of the King of Great Britain, residing at St. Germain de Grantham, county of Drummond, in the Province of Quebec, Canada, have invented certain new and useful Improvements in Potato-Diggers; and I do hereby declare that the following is a full, clear, and exact description of the invention, such as will enable others skilled in the art to which it appertains to make and use the same.

The present invention relates to vegetable harvesting machines, and more particularly to machines for digging and gathering potatoes and similar root crops.

Broadly speaking, it comprises a suitable frame, means for digging the roots, and means for automatically raising the digging means as the machine is turned to be drawn in an opposite direction.

In order to more clearly disclose the construction, operation and use of the invention, reference should be had to the accompanying drawings forming part of the present application.

Throughout the several views, like reference characters designate the same parts.

In the drawings: Figure 1 is a side elevation of the machine; and Fig. 2 is a detail elevation of the means for raising the plow.

A frame 1 of suitable shape and construction is loosely mounted on the axle 2 of the machine. From the rear ends of the frame 1 are pivotally suspended braces 3, on which is mounted a scoop 4. The braces 3 are formed with branches or arms 6, extending forwardly and these arms 6 support a plow 7 adapted to enter the soil beneath the potatoes or other roots.

One very important point in a machine of this class is to provide means for lifting the plow and the scoop clear of the ground when it is desired to turn the machine to draw it in the opposite direction. To this end, a yoke 21 has been provided. This yoke is rigidly connected to the frame 1, the arms 6 and the sides of the scoop 4. Thus, whenever the yoke 21 moves, the plow and the scoop will move together. The forward end of the yoke 21 is provided with a bracket 22, in which is journaled a roller 23, under which rides a curved supporting rod or bar 24. This rod 24 is so formed as to curve sharply upward from each side of its center, and is provided with branches which are loosely sleeved upon the forward axle of the machine. In these branches is revolubly mounted a shaft 27, provided with a drum 31, to which is fixed one end of the cable or other flexible connection 32, its opposite end being secured to the forward frame of the machine. On this shaft is fixed a hand lever 26, which is provided with a catch which engages notches in an arc plate 25 carried by one of the branches or arms 24. Thus, in order to raise or lower the rod 24 and its connected parts, it is only necessary to swing the lever 26 forward or backward.

The operation of the machine is as follows: The forward axle is swung to a position substantially parallel with the rear axle 2. In such position, the roller 23 will lie in the lower part of the curved rod 24. The lever 26 is now swung forward or backward, as may be desired, to move the rod 24, and so adjust the plow and scoop to the proper depth. The machine is started and its forward movement forces the potatoes upwardly and rearwardly over the plow and completes the digging of the first row of potatoes. When the machine reaches the opposite end of the row, it is turned in the usual way to take the next row in the opposite direction. In so turning, however, the inclination of the rod 24 acts on the roller 23 to raise the yoke 21, and its connected parts, thus automatically raising the plow and scoop whenever the machine turns from a straightforward direction, and automatically lowering them when the straightforward direction is again resumed.

It is clear that many changes may be made in the construction and arrangement of the several parts of the machine, that many other combinations of these parts may be had, and that many substitutions may be resorted to, without in any way departing from the field and scope of the present invention, and it is meant to include all such within this application, wherein only a preferred form has been shown and described.

Having thus fully described my invention, what I claim as new, and desire to secure by Letters Patent, is:—

1. In a machine of the character described, a supporting frame, a plow pivotally suspended therefrom, and means for automatically raising said plow as the machine is turned from a straightforward direction.

2. In a machine of the character described, a supporting frame, a plow pivotally suspended therefrom, and means for automatically raising said plow as the machine is turned from a straightforward direction, said means comprising a yoke connected to the plow, a curved rod and sliding connections between the yoke and rod.

In witness whereof I have hereunto set my hand in the presence of two witnesses.

JOSEPH MOREAU.

Witnesses:
T. MYNARD,
L. C. GAUTHIER.